United States Patent
Allen et al.

(10) Patent No.: US 9,564,032 B2
(45) Date of Patent: Feb. 7, 2017

(54) ENHANCED SECURITY SYSTEM

(71) Applicant: MOTOROLA SOLUTIONS, INC, Schaumburg, IL (US)

(72) Inventors: Vernon A Allen, Ft. Lauderdale, FL (US); Richard Herrera, Plantation, FL (US)

(*) Notice: Subject to any disclaimer, the term of this patent is extended or adjusted under 35 U.S.C. 154(b) by 270 days.

(21) Appl. No.: 13/907,382

(22) Filed: May 31, 2013

(65) Prior Publication Data

US 2014/0354399 A1 Dec. 4, 2014

(51) Int. Cl.
*G06F 7/04* (2006.01)
*G08B 13/22* (2006.01)
*H04B 5/00* (2006.01)
*G07C 9/00* (2006.01)

(52) U.S. Cl.
CPC .......... *G08B 13/22* (2013.01); *G07C 9/00896* (2013.01); *H04B 5/0012* (2013.01); *H04B 5/0075* (2013.01); *G07C 2009/00809* (2013.01)

(58) Field of Classification Search
CPC ................................. G07C 9/0069; G07F 7/08
USPC .......................................................... 340/5.3
See application file for complete search history.

(56) References Cited

U.S. PATENT DOCUMENTS

| | | | |
|---|---|---|---|
| 5,198,643 A * | 3/1993 | Miron et al. ................ 235/382 |
| 5,204,672 A | 4/1993 | Brooks | |
| 5,682,032 A | 10/1997 | Philipp | |
| 6,695,207 B1 | 2/2004 | Norris, Jr. | |
| 6,771,161 B1 | 8/2004 | Doi et al. | |
| 6,774,796 B2 | 8/2004 | Smith | |
| 6,992,565 B1 | 1/2006 | Giesler | |
| 7,202,773 B1 | 4/2007 | Oba et al. | |
| 8,260,262 B2 | 9/2012 | Ben Ayed et al. | |
| 2005/0125674 A1 | 6/2005 | Nishiki et al. | |
| 2007/0118891 A1 | 5/2007 | Buer | |
| 2009/0096577 A1 | 4/2009 | Pollabauer | |
| 2009/0240947 A1 | 9/2009 | Goyal et al. | |
| 2010/0328033 A1 | 12/2010 | Kamei | |
| 2012/0023558 A1 | 1/2012 | Rafiq | |

(Continued)

FOREIGN PATENT DOCUMENTS

| | | |
|---|---|---|
| EP | 2098419 B1 | 1/2013 |
| EP | 2580886 A1 | 4/2013 |

(Continued)

OTHER PUBLICATIONS

Corresponding International Application No. PCT/US2014/038308—International Search report dated Aug. 1, 2014.

(Continued)

*Primary Examiner* — Vernal Brown
(74) *Attorney, Agent, or Firm* — Barbara R. Doutre (57) ABSTRACT

A security system (100) protects a secured item by a lock which is under the control of a lock control unit (108). Predetermined parameters associated with various users and user equipment are stored in the lock control unit (108). The predetermined parameters are weighted to provide different levels of lock access. When a user (116) makes contact with the secured item through a BAN device, a user configuration database is transmitted from a user's PAN device to the controller for comparison with the predetermined parameters. Lock (104) access can be modified for different authorized users.

24 Claims, 4 Drawing Sheets

(56) References Cited

U.S. PATENT DOCUMENTS

2012/0158847 A1* 6/2012 Bertin .......................... 709/204
2012/0250546 A1* 10/2012 Hamida et al. ............... 370/252
2012/0298119 A1* 11/2012 Reese et al. .................. 128/875

FOREIGN PATENT DOCUMENTS

| JP | 2009009497 A | 1/2009 |
|---|---|---|
| KR | 2010056688 A | 5/2010 |
| WO | 2009123779 A1 | 10/2009 |
| WO | 2011055899 A1 | 12/2011 |

OTHER PUBLICATIONS

Microchip Inc.—BodyCom Technology Could Be Used to Secure Guns, Gadgets—Laura Shin, Mar. 20, 2013. Extracted from: http://www.smartplanet.com/blog/bulletin/bodycom-technology-could-be-used-to-secure-guns-gadgets/14514.

MIT Technology Review—Authentication System Would Use the Body to Secure Guns and Gadgets—Rachel Metz, Mar. 8, 2013. Extracted from: http://www.technologyreview.com/news/512056/authentication-system-would-use-the-body-to-secure-guns-and-gadgets/.

BioValidation.com—Voice and Keystroke Authentication—FAQs. Copyright 2013. Extracted from: http://www.biovalidation.com/biometrics-faqs.aspx.

\* cited by examiner

ENHANCED SECURITY SYSTEM

FIELD OF THE DISCLOSURE

The present invention relates generally to security systems and more particularly to the enhancement of security systems that utilize skin based technology.

BACKGROUND OF THE INVENTION

Security systems are used in a variety of environments to protect property and people. In the public safety environment for example, guns are often secured and access is limited to authorized personnel. Proper authorization is critical when controlling user access to such secured property. The utilization of traditional locks, keys, and passcodes can often take up valuable time, for example when an officer is on-scene. The use of electronic security systems has provided some improvement to facilitate access to secured property. For example, a remote transmitter can be used to automatically lock and unlock a secured item. However, electronic security systems utilizing remote transmitters can be susceptible to interception allowing anyone having the remote transceiver to access the secured item. More recently, skin based communication systems have been developed as a possible solution to the access problem. In a skin based security system, the act of touching forms a communication path across a users' skin between a remote unit and a control unit. However, even skin based security systems still face issues with lost or stolen transmitters. Additionally, skin based security systems are subject to a human chain effect, where the technology transfers data over the length of several people in contact with each other (for example holding hands). An unauthorized person can potentially gain access to the secured item by maintaining physical contact with an authorized user.

Accordingly, there is a need for an improved security system that addresses the aforementioned problems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is described herein a enhanced security system which utilizes a lock control unit for controlling a lock of a secured item, the lock control unit receiving and transmitting signals to and from a BAN remote unit and PAN controller device worn by a user attempting to access the lock. The enhanced security system addresses the issues of a lost transceiver and the human chain effect through the use of a user configuration database customized and weighted for individual authorized users. Predetermined parameters associated with various users and their user equipment are stored in the lock control unit, these predetermined parameters are gathered from an initial user configuration database created by the PAN controller device in association with the BAN remote device. The initial user configuration database is created by having the user make/break contact with the secured item during a training period while initial data and measurements are taken by the PAN controller device and the BAN remote unit which are transferred for storage at the lock control unit as predetermined parameters. The predetermined parameters are weighted based on level of importance to identify a true authorized user. In detection operation, the user makes subsequent contact with the secured item through the BAN device, the user's current configuration data is transmitted from a user's PAN device and BAN device to the lock control unit for comparison with the predetermined parameters. Various levels of lock access are provided by the lock control unit based on how good the weighted match is, from an automated full unlock to complete lockdown with no access permitted.

Figure 1:
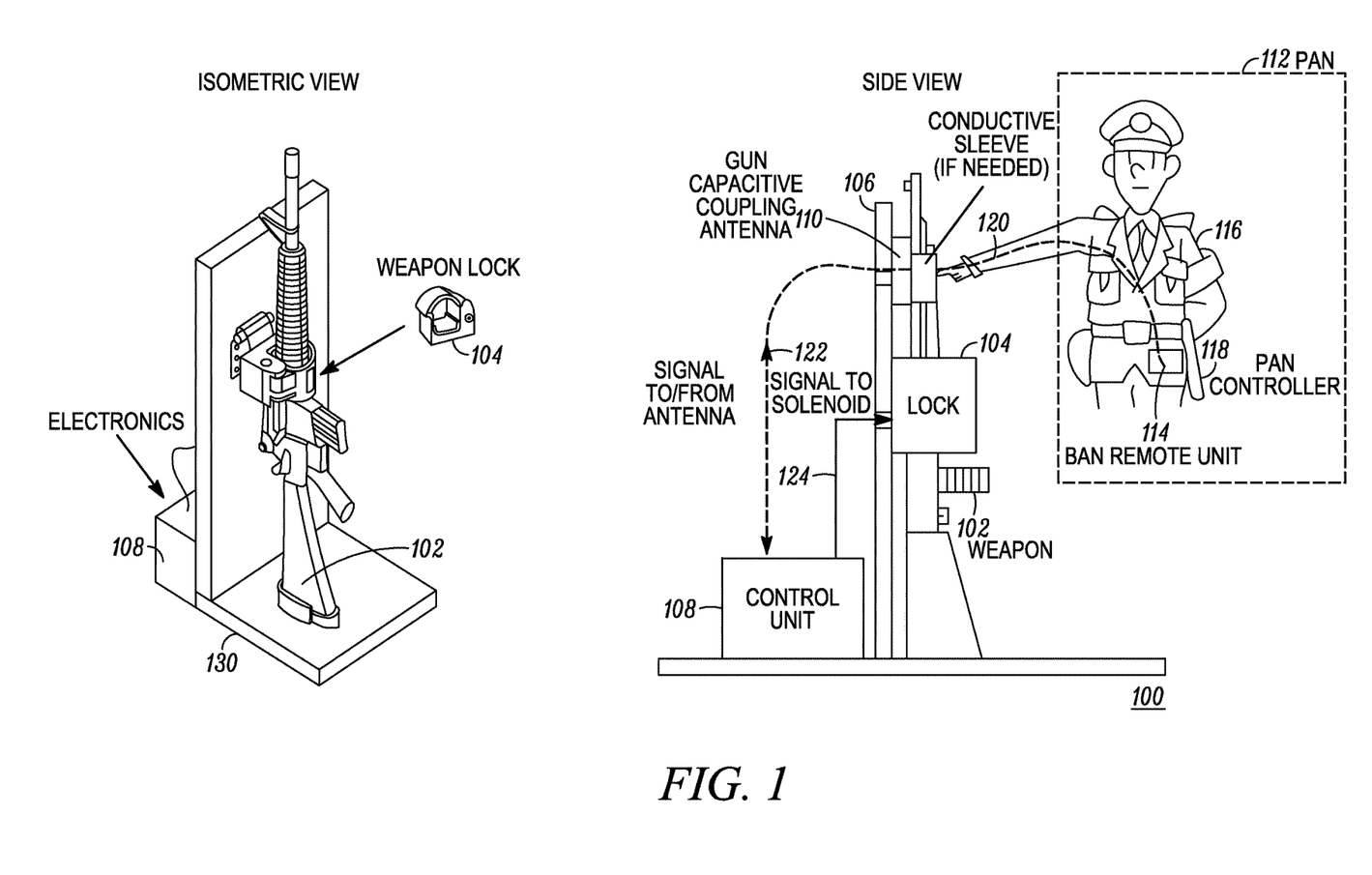
FIG. 1 is an illustration of a skin based communication system operating in accordance with the various embodiments.

FIG. 1 is a diagram of a security system 100 operating in accordance with the various embodiments. Security system 100 comprises an item 102 secured by a lock 104, the lock being under the control of lock control unit 108. An antenna 106 is operatively coupled to the lock control unit 108. The lock 104 may be a solenoid lock or other lock capable of being opened via a control signal. A user 116 wishing to unlock the secured item 102 carries a body area network (BAN) remote unit 114 and a personal area network (PAN) controller device 118 as part of a skin based communication system. The BAN remote unit 114 and PAN controller device 118 operate, along with any other PAN devices, within a PAN network 112. The PAN controller device 118 may be part of a portable two-way radio, some other user worn device, or a stand-alone device. The item being secured may be a gun, medical supplies or other item needing to be locked. The lock control unit 108, item 102 and lock 104 may be mounted within or mounted to an apparatus such as a mounting apparatus 130, for example a trunk of a vehicle, a cabinet, or other suitable mounting apparatus.

A PAN is a network that is personal in nature, meaning that its distance between sender and receiver is limited, usually no more than 30 feet. Bluetooth technology is an example of PAN network technology because it creates a small network between two devices that are usually located in very close proximity to each other. In this embodiment, a PAN controller device 118 communicates with the BAN remote unit 104. The PAN controller device 118 can measure received signal strength (RSSI) of the BAN remote unit 114 as well as bio-monitoring levels of the BAN remote unit.

The BAN remote unit 114 is shown as a separate device worn by the user 116, but may also be part of a single device. A body area network (BAN), also referred to as a wireless body area network (WBAN) or a body sensor network (BSN), may comprise a wireless network of wearable computing devices. The term "BAN" refers to systems where communication is entirely within, on, and in the immediate proximity of a human body. For example, the BAN remote unit 114 may use a metal detector to determine if handcuffs are located on the user's body.

The lock control unit 108 is operatively coupled to the lock 104 and the antenna 106. The BAN remote unit 114 is operatively to the lock control unit 108 in response to user contact (skin communication) with the secured item, for example capacitive coupling, inductive coupling or other coupling means related to touch. An example of a skin communication system is that taught by BodyCom from Microchip, such as with part MCP2035. Communications between the lock control unit and the BAN remote unit is achieved via a physical path that encompasses an antenna in or near the lock, the weapon and the user's hand. This IC permits the injection and transmission of digital data via the skin or though materials with permittivity similar to skin such as silicon impregnated with carbon as well as metals.

In accordance with the various embodiments, the lock control unit 108 comprises a plurality of predetermined parameters stored therein. These predetermined parameters are individually weighted to determine access of a user to the lock 104 or further to provide different levels of access to the lock 104. In operation, the BAN remote unit 114 is operatively coupled to lock control unit 108 in response to user contact with the secured item 102. In response to the BAN remote unit 114 being operatively coupled to the secured item 102, the PAN controller device 118 generates a user configuration database. The user configuration database is transmitted as a configuration database signal from the BAN remote unit to the antenna 106 and as signal 122 to lock control unit 108. The lock control unit 108 compares the received user configuration database to the predetermined parameters and the weighting of the predetermined parameter to unlock the secured item 102 via a lock control signal 124.

The predetermined parameters stored within the lock control unit 108 may comprise a plurality of elements such as BAN ID, radio ID, RSSI levels of the BAN, and equipment verification for a plurality of different users. Equipment verification may verify the presence of such equipment as a portable radio, a cell phone, a BLUETOOTH headset, gun, taser, and/or handcuffs to name a few. The predetermined parameters are used by lock control unit 108 to determine if the user 116 has appropriate authority to access the item 102. Weighting of the parameters may be based on the likelihood that the individual will have the equipment in his presence while needing to access the secured item. For example, an officer's two-way radio is far more likely to be kept on or near the officer's body, whereas a headset might be an item more likely to be lost or dropped. Some equipment can be weighted more heavily than others based on the officer's typical role.

The weighting of equipment can be done for example, on a daily basis based on how the user suits-up for the day. Thus, if one of the equipment parameters being used in the configuration database is a taser, and the user is not carrying a taser on that day, the predetermined parameters will be adjusted accordingly to minimize the weighting of the tazer. Thus, the weighted predetermined parameters can be dynamically adjusted on a daily basis, or some other basis, depending on which equipment a user is wearing about his body at any given time.

Once the predetermined parameters have been established, and the user 116 touches the secured item 102, the PAN transmits a subsequent user configuration database to the lock control unit 108. The user configuration database is generated locally at the user based on measurements and data taken by the PAN controller device 118 and BAN remote unit 114. In an embodiment, the PAN controller device 118 may check to the presence of a BAN ID, RSSI thresholds of the BAN device and equipment on or about the user's body. This subsequent user configuration database is transferred to the lock control unit 108 for comparison to the weighted predetermined parameters stored in the control unit 108 for that individual user.

If all the parameters that are detected are matched to the weighted predetermined thresholds, then the lock control unit 108 identifies a high confidence lock mode and unlocks the lock automatically. If partial matches are made, or highly weighted elements are missing, the lock control unit 108 detects a low confidence lock mode, limiting the access to the lock, such as by manual access using a key or passcode. Thus first, second, third (and so on) confidence lock modes can be generated based on the weighted predetermined parameters.

With each of the predetermined parameters being weighted, lock access can proceed by automatic unlock for a full match. Lock access can be modified, for example to allow for manual unlock when a partial match of the predetermined parameters to the configuration database occurs. Lock access may be denied completely if the comparison indicates that no matches or weighted parameters align indicating that an unauthorized person is attempting to access the item.

For re-locking the item, the parameters may be weighted such that a proper BAN ID is sufficient to initiate automat lock of the item.

Thus, the lock control unit 108, upon coupling of the BAN to the secured item, provides a plurality of lock access modes based on the matches and the weighting of predetermined parameters with the subsequent user configuration database. The existence of a plurality of devices on the user, such as a police officer, will give rise to a plurality of different weightings for each device. The authentication process can give more relevance/weighting to some devices than others. This is an important aspect of the system, because an individual may potentially loose (or simply turn off) a piece of equipment, such as a Bluetooth headset for example, which would likely be assigned a very low weighting number, as opposed to a portable two-way radio which is expected to be attached to the hip or located about the user's body at all times, and would thus have a very high weighting number.

Figure 2:
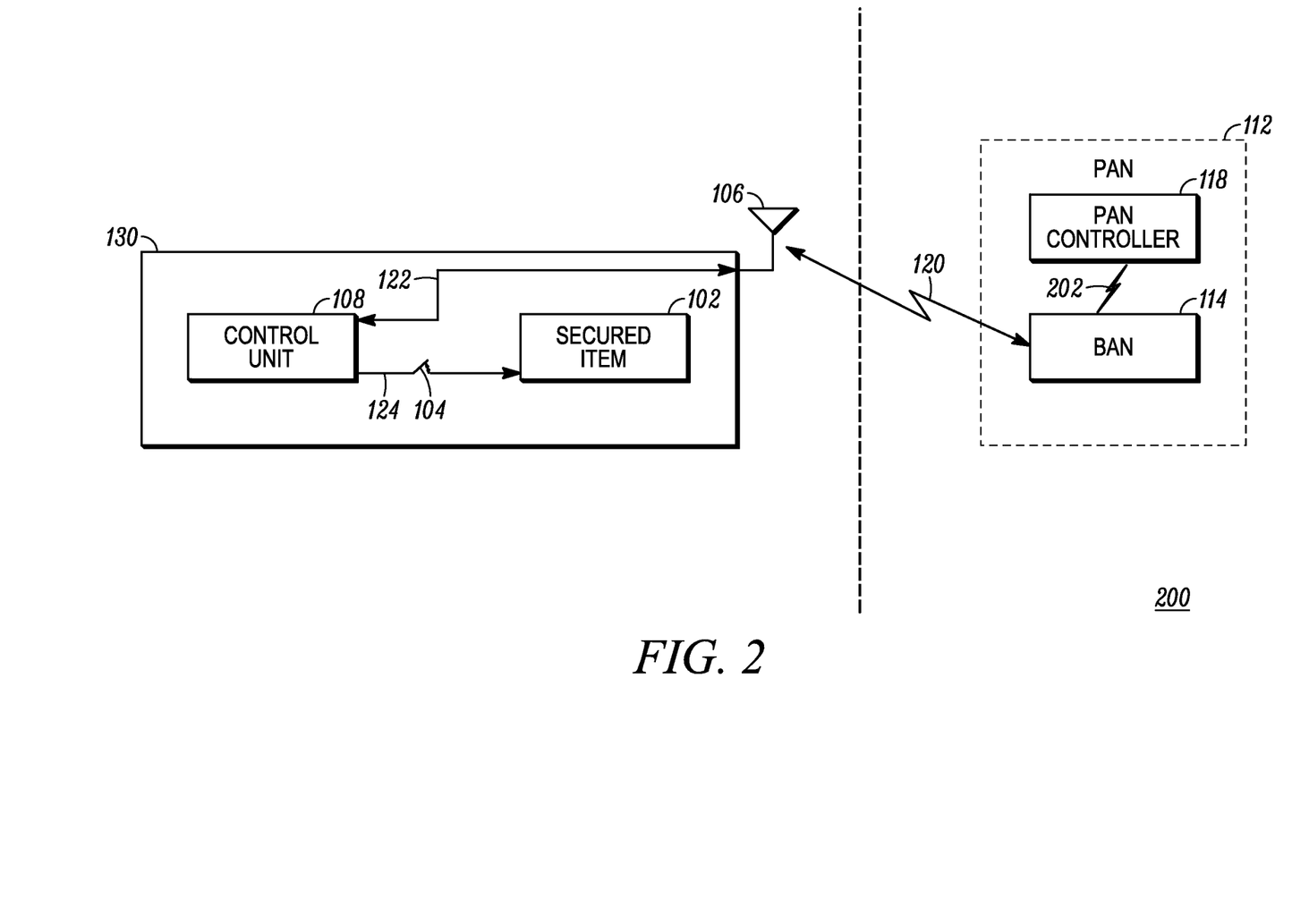
FIG. 2 is a block diagram of the communication system of FIG. 1 operating in accordance with the various embodiments.

FIG. 2 is a block diagram of the security system of FIG. 1 operating in accordance with the various embodiments. Communication system 200 comprises secured item 102 operatively coupled to lock control unit 108. The PAN controller device 118 detects the presence of the BAN remote unit 114 through wireless signal 202 within PAN network 112. Antenna 106 receives the configuration database information via signal 120 which is then provided as signal 122 to the lock control unit 108 for comparison to weighted predetermined parameters. When a sufficient match has occurred between the weighted predetermined parameters of control unit 108 and the user configuration database sent from the BAN remote unit 114, the lock control unit 108 generates the lock control signal 124 to unlock the lock 104. The degree of access to the lock 104 is determined based on the weighted parameters. A plurality of lock access modes can be generated based on the weighted match. The different lock modes may comprise, but are not limited to, automatic unlock, limited access via manual lock, lock shut down, and/or full lock down with alarm.

Figure 3:
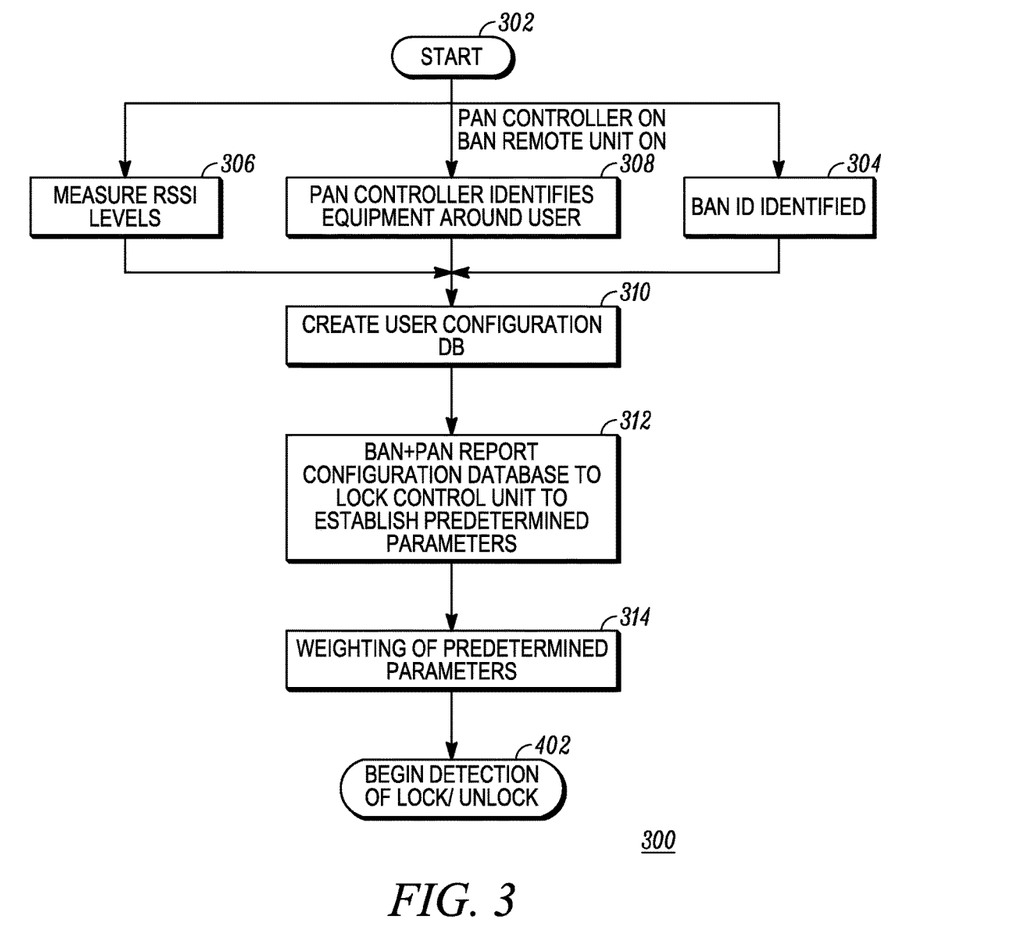
FIG. 3 is a flowchart of a method of gathering predetermined parameters for the security system in accordance with the various embodiments.

FIG. 3 is a flowchart of a method 300 of acquiring the weighted predetermined parameters for the security system 100 in accordance with the various embodiments. Method 300 may also be referred to as a training mode for acquiring the weighted predetermined parameters. Training begins at 302 by turning on the PAN controller device and BAN remote unit. If no BAN remote unit is available, then a warning is generated by the PAN controller device to alert the user that no BAN device is available. The reason for this alert is that the BAN ID is considered a key parameter to gaining access to the lock. At 304, the BAN ID is identified and stored in the PAN controller device. At 306, BAN RSSI levels may be measured and stored in the PAN controller device. The measurement of RSSI levels need not be done upon each training session. The RSSI levels are used as a means to avoid a human-chain effect, but RSSI levels are not required to be measured with each training session as would be expected of the equipment verification, as equipment is far more likely to be changed by a user. At 308, the PAN controller device identifies equipment on or about the user and stores as equipment verification information. These measurements can be taken over the training session in which the user touches and releases the secured item while an initial user configuration database is created at 310.

The PAN controller device transmits the user configuration database to the control unit. The PAN and BAN are thus being used as a part of a training session to gather user configuration data to be stored in the control unit as predetermined parameters. The predetermined parameters are also weighted at 314. The weighting of the predetermined parameters allows for different lock access profiles to be formed for a plurality of individual authorized users. Hence, the predetermined parameter of BAN ID, might be the most heavily weighted parameter, while components within the equipment verification might be weighted more highly or less highly depending on the piece of equipment. For example, equipment verification of a two-way radio ID might be weighted more heavily than a taser or headset.

Hence, the initial user configuration information is now established as the weighted predetermined parameters. A plurality of different user profiles can be stored as weighted predetermined parameters within the lock control unit. Method 300 thus provides the means for acquiring and storing the weighted predetermined parameters discussed in FIGS. 1 and 2. The purpose of method 300 is to acquire an initial user configuration database that can be used by the control unit for the creation of weighted predetermined parameters with which to determine a user's subsequent access to the lock.

At 402, the system is ready to begin detection for locking and unlocking the item. This detection may take place at a much later point in time, as the parameters are now stored.

Figure 4:
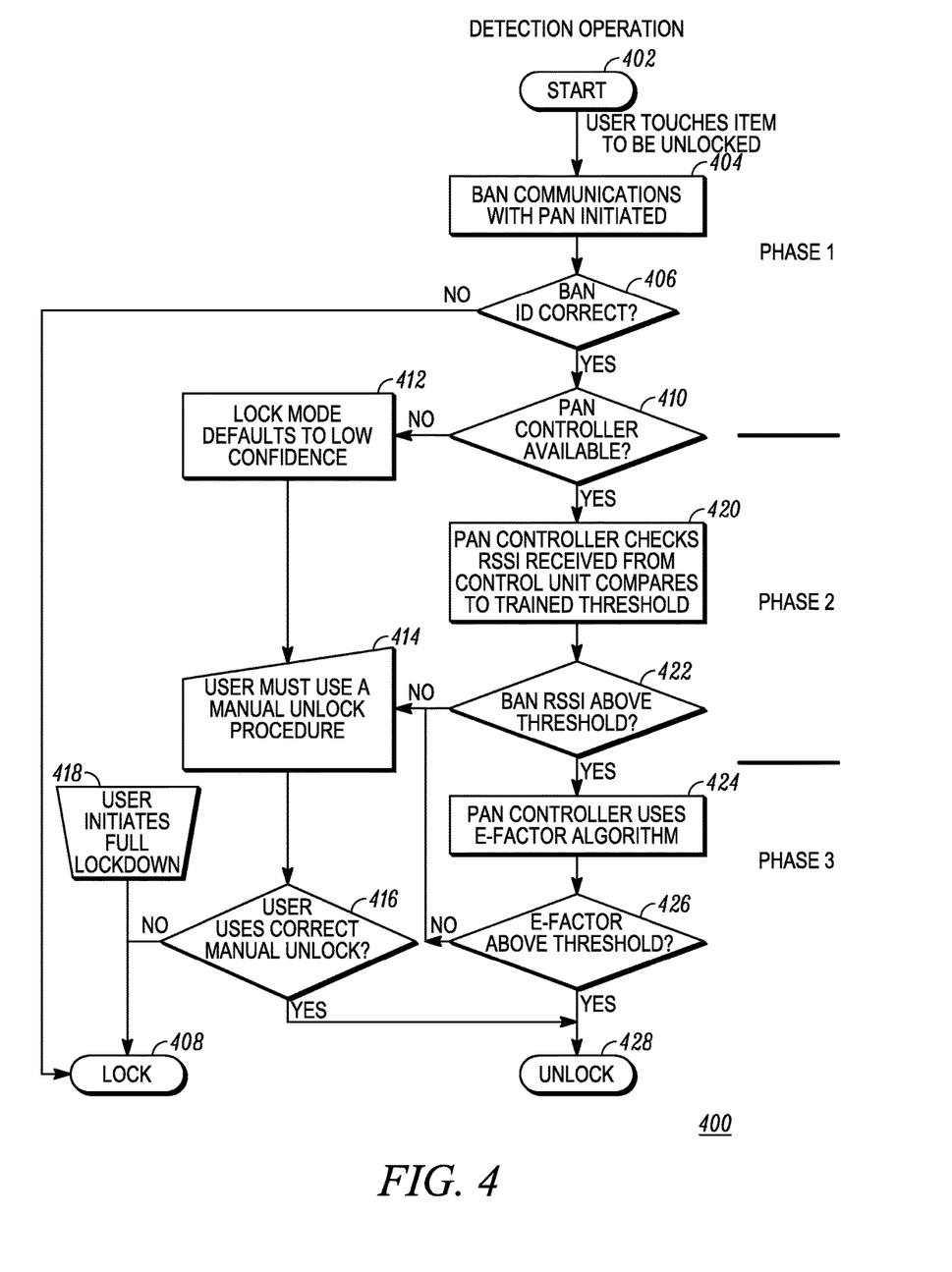
FIG. 4 is an additional flowchart of the method of operating the security system in accordance with the various embodiments.

FIG. 4 begins detection operation at 402 by sensing that a user has touched the item to be unlocked. Communications between the BAN remote unit and the PAN controller device are initiated at 404. Three phases or checks are made prior to an automatic unlocking of the item. Phase 1 provides a limited check based on BAN ID. However, the BAN ID is the most heavily weighted factor and without a match, the lock will not unlock. Phase 2 provides an additional check of BAN RSSI thresholds, but will provide manual access to the lock if the RSSI parameters do not fall within predetermined parameter thresholds. The use of RSSI threshold will eliminate the human chain problem discussed previously because the RSSI of the user touching the secured item will the strongest while others down the human-chain will have progressively diminished RSSI levels. Phase 3 provides an even more detailed check of the user equipment, such as radio ID and other devices known to be worn by that particular user. Phase 3 ensures that the BAN remote unit has not been stolen.

The previous weighting of the predetermined parameters during the training stage 300, and the ability to update the weighting of the predetermined parameters provides for dynamic authorization which is truly customized for each authorized user.

At 406, a determination by the lock control unit 108 is made as to whether the BAN ID is correct, in other words is the BAN ID a match to the predetermined ID parameter. If there is no BAN remote unit or the BAN ID is incorrect, the lock will remain locked at 408.

Once the BAN ID has been verified, the PAN controller device is checked for availability at 410, to detect other current configuration data. If the PAN controller device is not available, but the BAN ID was a match at 406, the system identifies a low confidence lock mode at 412 which limits access to the lock to a manual unlock procedure at 414. As long as the user has the correct manual lock, for example a key or pass-code at 416, then the lock will unlock at 428. Without the correct manual lock at 416, the lock remains locked at 408. It is also possible that a user might initiate lock down as well at 418.

If the PAN controller device is available for taking current data at 410, the PAN controller device begins taking BAN RSSI measurements at 420 and transmitting the measurements to the lock control unit 108 via the PAN. If the lock control unit determines that the BAN RSSI measurements do not meet the threshold, as previously stored by the predetermined parameters in FIG. 3, then the user can only unlock the device by taking the extra manual steps 414 and 416.

If the lock control unit determines that the BAN RSSI measurements do meet the threshold predetermined parameters, then the PAN controller device checks equipment verification. For example, an e-factor algorithm can be used to determine a two-way radio ID, and the presence of a headset and handcuffs or other elements known to be worn by the user. If the verification at 426 meets the weighted parameters, then the lock will automatically be unlocked by the system for immediate access to the item. If the user is missing some non-critical items, such as a headset (less heavily weighted), but has the correct radio ID (more heavily weighted), the user can be given limited access to the lock at 414, 416. The equipment verification step further protects against stolen BAN remote units trying to gain access to secured items. If the system detects that the remote BAN device may potentially be stolen, the system can further trigger an alarm.

While the flowchart 400 describes RSSI levels being measured by the BAN and transmitted by the PAN, other BAN type measurements such as bio-monitoring levels and metal detection or any other BAN type function can be measured. Some measured parameters can be transmitted to the lock control unit directly from the BAN while others go through the PAN.

Embodiments as taught herein provide the benefit of BAN ID verification, RSSI threshold verification, and equipment verification. The weighting of these parameters minimizes the human chain problem and the use of a stolen BAN device being used to access a secured item. The weighting and various confidence levels provided by the embodiments allows a user having a BAN device not meeting the RSSI threshold or who may be missing a non-critical equipment item to still gain access via a manual procedure. The disclosed embodiments are particularly useful for the public safety environment where guns, tear gas, or other items are in need of being secured but also have a need for fast access in the case of an emergency. The embodiments also apply to the medical field where emergency personnel may need quick yet secure access to medication or expensive medical equipment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A security system, comprising:
a lock for securing an item;
an antenna;
a lock control unit operatively coupled to the antenna and the lock, the lock control unit for enabling and disabling the lock based on predetermined parameters, the predetermined parameters being individually weighted;
a personal area network (PAN) controller device operating over a PAN network;
a remote body area network (BAN) remote unit operating within the PAN network;
the BAN remote unit providing coupling to the secured item in response to user contact with the secured item;
the PAN controller device generating a user configuration database, the user configuration database being transmitted to the antenna and lock control unit in response to the BAN being coupled to the secured item; and the lock control unit comparing the user configuration database to the predetermined parameters and the weighting of the predetermined parameters to unlock the secured item.

2. The security system of claim 1, wherein the predetermined parameters are based on a plurality of BAN ID, BAN RSSI levels, and equipment verification associated with a plurality of authorized users.

3. The security system of claim 2, the lock control unit provides a plurality of lock access modes based the predetermined parameters matching with the user configuration database upon coupling of the BAN remote unit to the secured item.

4. The security system of claim 3, wherein the plurality of lock access modes comprise: automatic unlock, manual unlock, verification of additional pass code prior to unlock, full lockdown, use of key to unlock, full lockdown with alarm.

5. The security system of claim 4, wherein the manual unlock comprises: a pass code prior to unlock or a key to unlock.

6. The security system of claim 3, wherein the predetermined parameters are based on an initial user configuration data taken for BAN ID, RSSI threshold, and equipment verification for a plurality of individual authorized users.

7. The security system of claim 3, wherein various levels of lock access are provided by the lock control unit based on how good the weighted match is, from an automated full unlock to complete lockdown with no access permitted.

8. The security system of claim 1, wherein the lock comprises a solenoid lock.

9. The security system of claim 1, wherein the equipment verification checks for data associated with a portable radio, a cell phone, a BLUETOOTH headset, a gun, a taser, handcuffs and the BAN remote unit.

10. The security system of claim 1, wherein the BAN remote unit and the PAN controller device are physically separate devices, not integrated together.

11. The security system of claim 1, wherein the lock control unit, item and lock are mounted within or mounted to a mounting apparatus.

12. The security system of claim 1, wherein the predetermined parameters are individually weighted based on level of importance and utilized as thresholds to compare to subsequent user configuration data measured by the BAN and PAN and transmitted to the lock control unit in response to touching the secured item, wherein the secured item is unlocked by the lock control unit, when the subsequent user configuration data meets the thresholds of the weighted predetermined parameters.

13. A method of operating a security system, comprising:
storing predetermined parameters in a lock control unit, the predetermined parameters based on previously measured BAN and PAN data pertaining to an authorized user touching a secured item of the security system and equipment used by the authorized user;
weighting the predetermined parameters based on level of importance to the security of the security system;
utilizing the weighted predetermined parameters as thresholds to compare to subsequent user configuration data measured by the BAN and PAN and transmitted to the lock control unit in response to touching the secured item ; and
unlocking a lock of the secured item, by the lock control unit, when the subsequent user configuration data meets the thresholds of the weighted predetermined parameters.

14. The method of claim 13, further comprising:
preventing lock access by an unauthorized user in response to a BAN remote unit being determined to be stolen based on the subsequent user configuration data not meeting the weighted predetermined parameters.

15. The method of claim 14, further comprising:
limiting lock access to manual operation in response to subsequent user configuration data meeting certain weighted predetermined parameters.

16. The method of claim 13, further comprising:
training the system using a BAN remote unit and PAN controller device performing lock and unlock actions on the secured item while the PAN controller device records data taken by the BAN remote unit and PAN controller device.

17. The method of claim 16, wherein the training comprises:
reading RSSI levels of the BAN remote unit by the PAN controller device;
reading bio-monitoring levels of the BAN remote unit by the PAN controller device;
storing the readings in the PAN controller device to configure a user configuration database;
transmitting the user configuration database to the lock control unit of the security system; and
weighting the user configuration database to generate the weighted predetermined parameters at the control unit for subsequent locking and unlocking detections.

18. The method of claim 13, further comprising:
generating, by the lock control unit, a predetermined lock confidence level based on the weighted predetermined parameters.

19. The method of claim 18, wherein the predetermined lock confidence level based on at least one of: BAN ID verification, RSSI measurement of the BAN remote unit, and equipment verification.

20. The method of claim 13, further comprising:
generating, by the lock control unit, a first confidence lock level requiring manual operation of the lock and a second confidence lock level requiring manual operation of the lock, the first and second confidence lock levels being based on the weighting of the predetermined parameters.

21. The method of claim 13, further comprising:
determining, by a PAN controller device, whether a BAN remote unit is available; and
generating a warning signal when the BAN remote unit is not available.

22. The method of claim 13, further comprising:
generating an alarm when the weighted predetermined parameters indicate potential unauthorized use of the security system.

23. The method of claim 13, wherein the step of storing further comprises:
storing predetermined parameters in a lock control unit, the predetermined parameters based on previously measured BAN and PAN data pertaining to a plurality of authorized users of the security system and equipment used by the plurality of authorized users.

24. The method of claim 13, the weighted predetermined parameters protect against a lost or stolen BAN remote unit and a human chain effect.

* * * * *